United States Patent
Miyoshi et al.

(10) Patent No.: US 10,671,619 B2
(45) Date of Patent: Jun. 2, 2020

(54) INFORMATION PROCESSING SYSTEM AND INFORMATION PROCESSING METHOD

(71) Applicant: HITACHI, LTD., Tokyo (JP)

(72) Inventors: Toshinori Miyoshi, Tokyo (JP); Kiyoto Ito, Tokyo (JP); Tomoyuki Ishii, Tokyo (JP); Mineo Senda, Tokyo (JP); Yoshiharu Nagashima, Tokyo (JP)

(73) Assignee: HITACHI, LTD., Tokyo (JP)

( * ) Notice: Subject to any disclaimer, the term of this patent is extended or adjusted under 35 U.S.C. 154(b) by 356 days.

(21) Appl. No.: 15/551,747

(22) PCT Filed: Feb. 25, 2015

(86) PCT No.: PCT/JP2015/055481
§ 371 (c)(1),
(2) Date: Aug. 17, 2017

(87) PCT Pub. No.: WO2016/135905
PCT Pub. Date: Sep. 1, 2016

(65) Prior Publication Data
US 2018/0039633 A1 Feb. 8, 2018

(51) Int. Cl.
*G06F 16/20* (2019.01)
*G06F 16/2457* (2019.01)
(Continued)

(52) U.S. Cl.
CPC ...... *G06F 16/24578* (2019.01); *G06F 16/248* (2019.01); *G06F 16/24556* (2019.01);
(Continued)

(58) Field of Classification Search
None
See application file for complete search history.

(56) References Cited

U.S. PATENT DOCUMENTS 8,494,978 B2 * 7/2013 Pinckney ............ G06Q 30/02
706/11
2013/0238601 A1 9/2013 Kanemoto et al.
(Continued)

FOREIGN PATENT DOCUMENTS

JP 2013-089109 A 5/2013
JP 2013-214294 A 10/2013
(Continued)

OTHER PUBLICATIONS

"A Survey of Collaborative Filtering Techniques", Hindawi Publishing Corporation, Advances in Artificial Intelligence vol. 2009, Jan. 2009, Article No. 4.
(Continued)

*Primary Examiner* — Kristopher Andersen
(74) *Attorney, Agent, or Firm* — Volpe and Koenig, P.C.

(57) ABSTRACT

An information processing system includes a storing unit that stores evaluation data in which a plurality of subjects are associated with a plurality of evaluation expressions respectively and evaluation expression relationship data indicating relationships between the evaluation expressions, a question generating unit that generates and outputs questions on the basis of the evaluation data and the evaluation expression relationship data, and a matching unit that outputs information relating to the subject included in the evaluation data on the basis of responses when the responses with respect to the questions are input.

13 Claims, 8 Drawing Sheets

(51) Int. Cl.
  *G06F 16/248* (2019.01)
  *G06F 16/2455* (2019.01)
  *G06F 40/30* (2020.01)
  *G06F 40/194* (2020.01)
  *G06F 40/247* (2020.01)
  *G10L 15/18* (2013.01)
  *G06F 16/30* (2019.01)
  *G06F 16/335* (2019.01)
  *G06F 40/35* (2020.01)

(52) U.S. Cl.
  CPC .......... *G06F 40/194* (2020.01); *G06F 40/247* (2020.01); *G06F 40/30* (2020.01); *G10L 15/1822* (2013.01); *G06F 16/335* (2019.01); *G06F 40/35* (2020.01)

(56) References Cited

U.S. PATENT DOCUMENTS

2014/0351228 A1   11/2014   Yamamoto
2016/0063993 A1*  3/2016   Dolan .................... G06F 16/00
                                                                704/254

FOREIGN PATENT DOCUMENTS

JP   2014-164351 A    9/2014
WO   2013/080406 A1   6/2013

OTHER PUBLICATIONS

International Search Report for WO 2016/135905 A1, dated Jun. 2, 2015.

* cited by examiner

[Fig. 1]
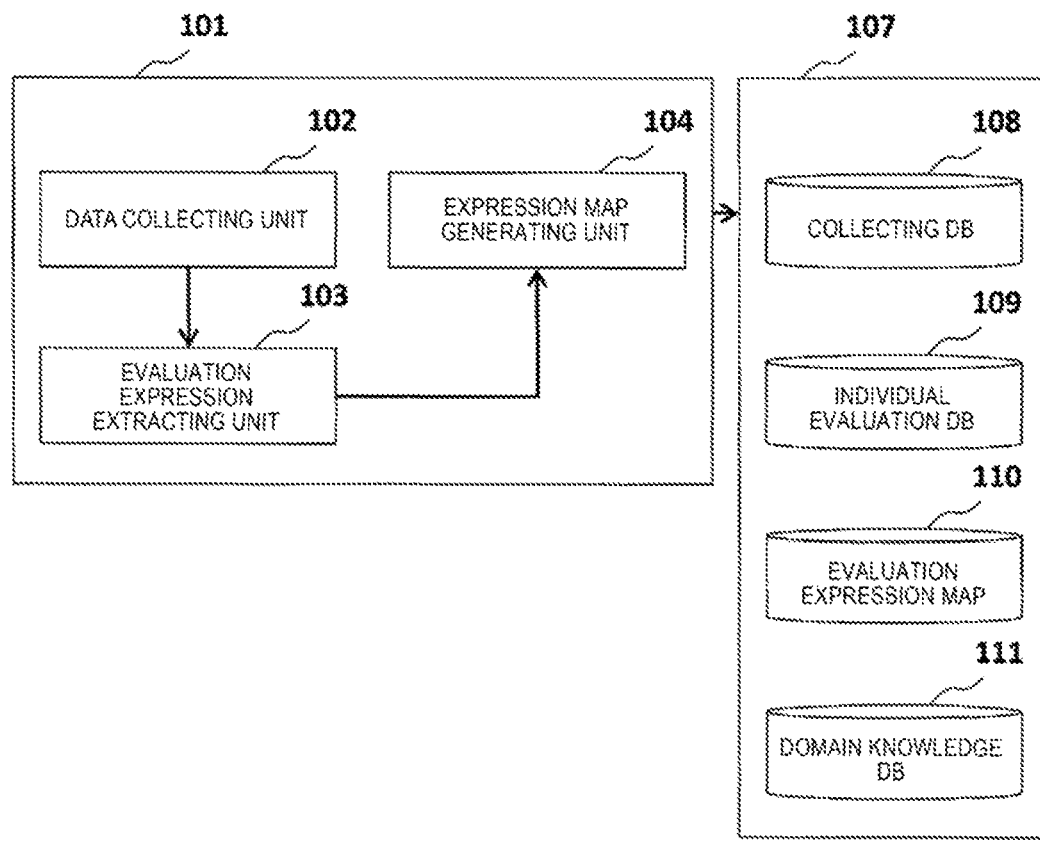
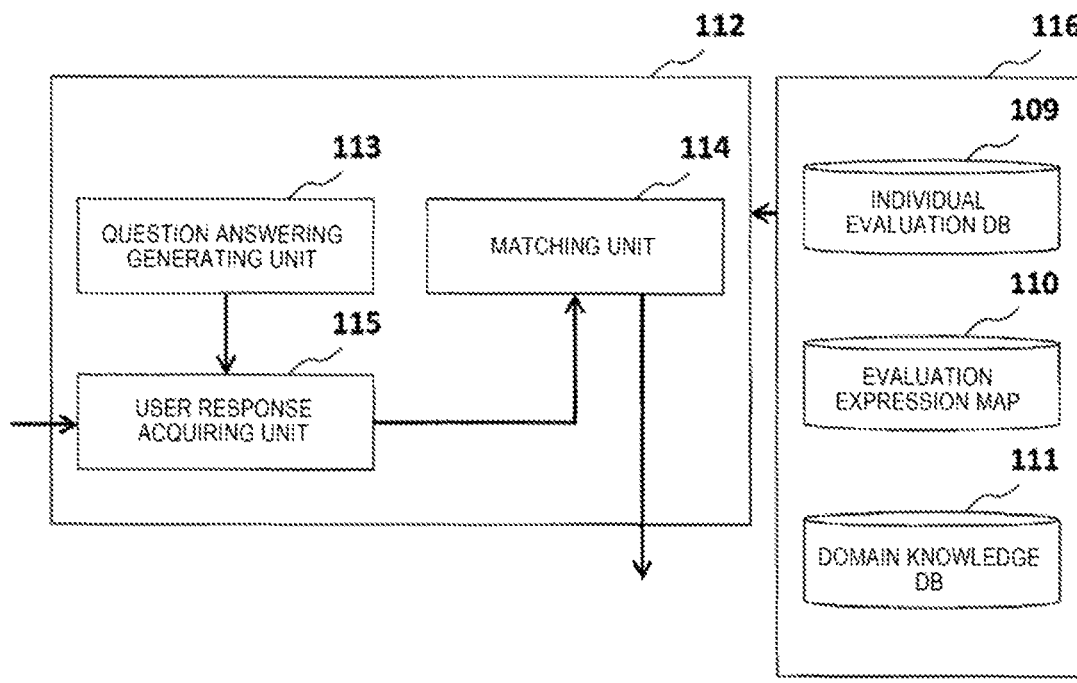

[Fig. 2]
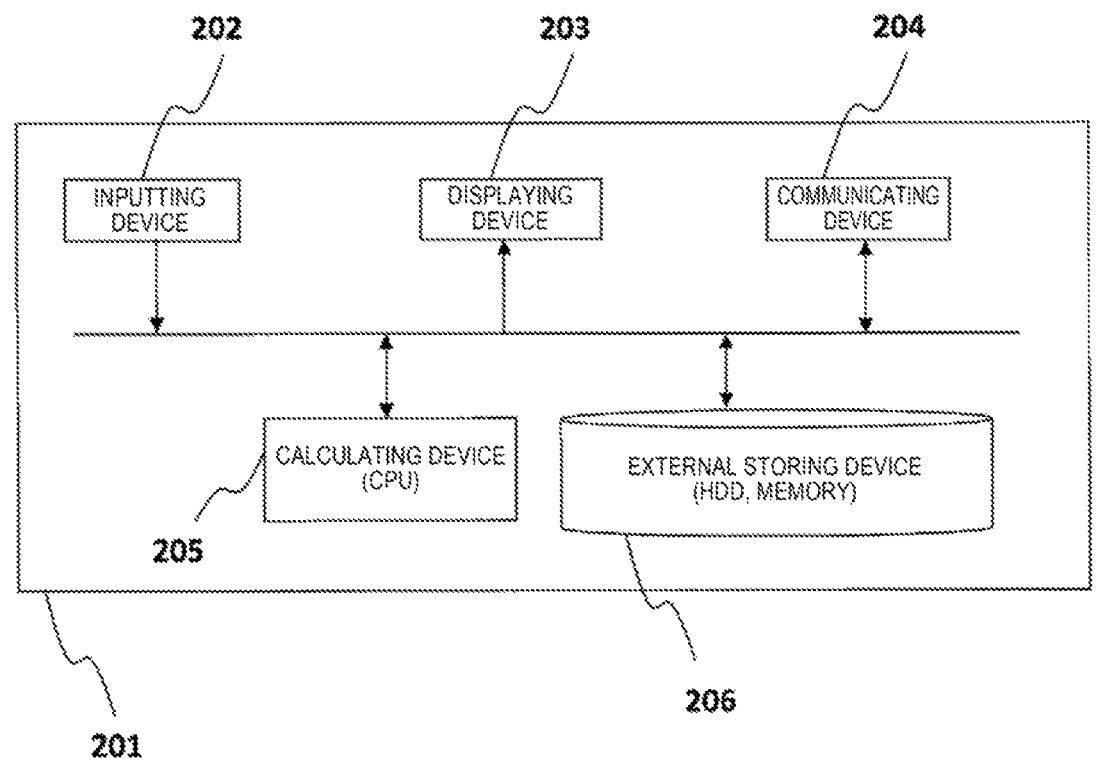
[Fig. 3]
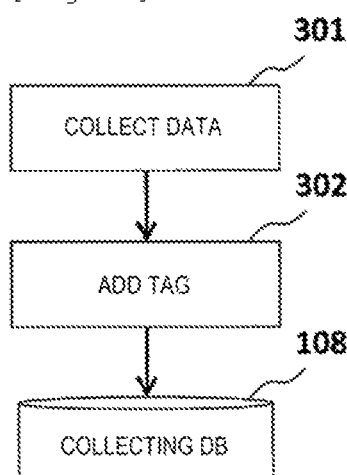

[Fig. 4]
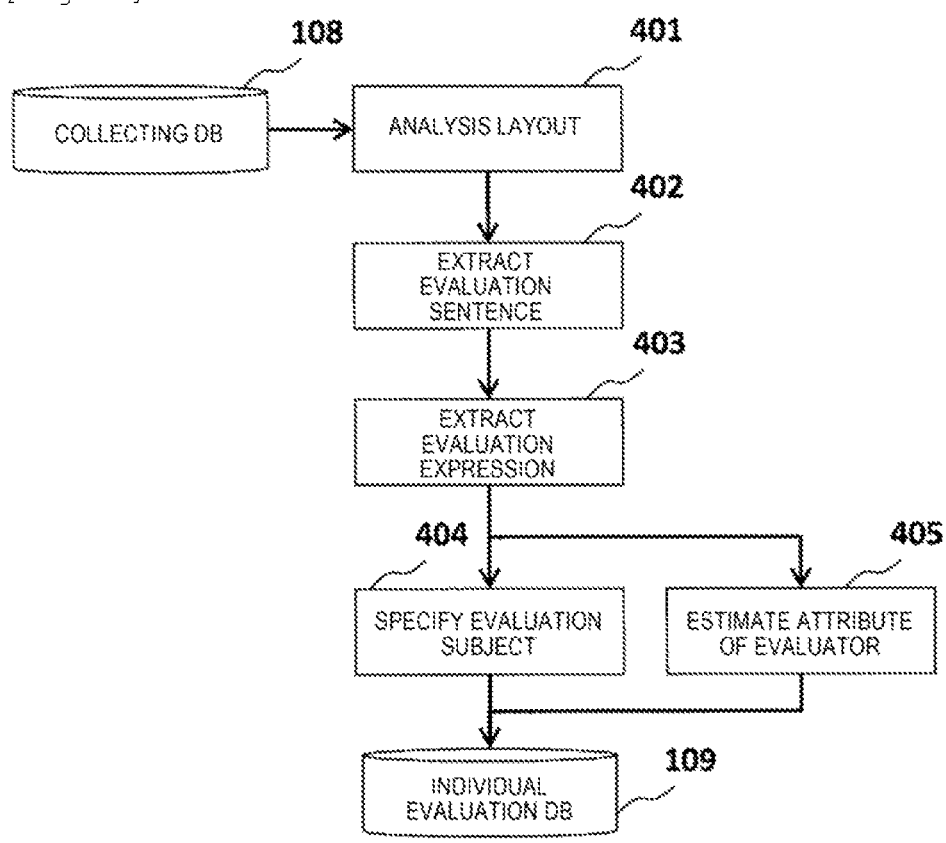

[Fig. 5]
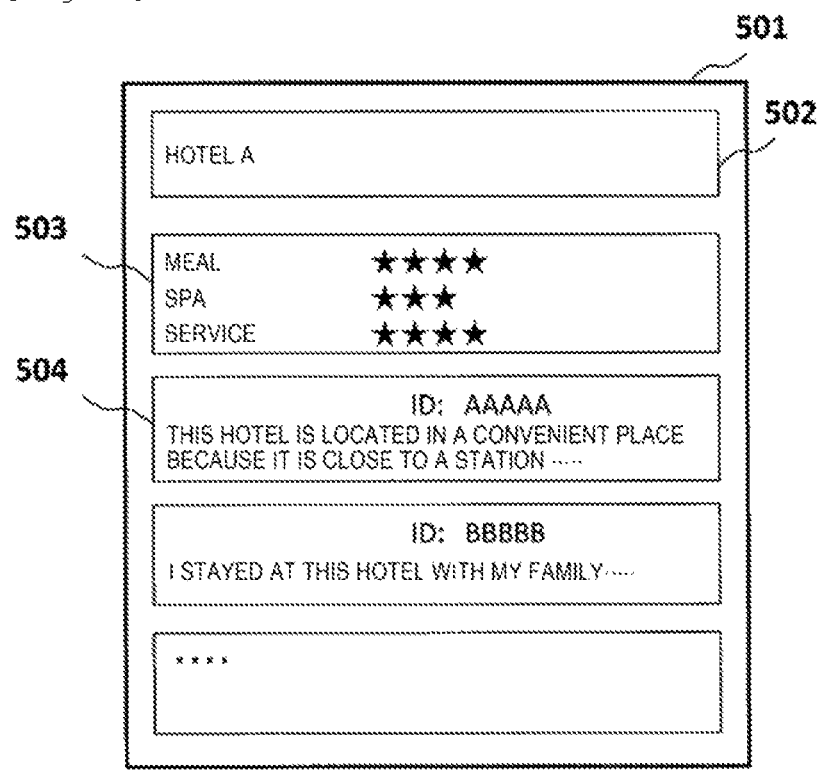

[Fig. 6]

| SUBJECT ID | SUBJECT TYPE | NAME | ... |
|---|---|---|---|
| 0012327 | HOTEL | HOTEL A | ... |
| 0823181 | RESTAURANT | RESTAURANT B | ... |
| ... | ... | ... | ... |

601A / 601B / 601C / 601

| SUBJECT ID | EVALUATION EXPRESSION | EVALUATOR TYPE ID |
|---|---|---|
| 0012327 | CLOSE TO STATION | |
| 0823181 | DELICIOUS | 0002137, 5538210 |
| ... | ... | ... |

602A / 602B / 602C / 602

| SUBJECT ID | ASSOCIATED SUBJECT ID |
|---|---|
| 0012327 | 0823181, 2831284, ... |
| 8852124 | 2819381, 8878124, ... |
| ... | ... |

603A / 603B / 603

| EVALUATOR TYPE ID | ATTRIBUTE |
|---|---|
| 0002137 | FAMILY = YES |
| 0002137 | PROFESSIONALISM = 0.87 |
| ... | ... |

604A / 604B / 604

[Fig. 7]
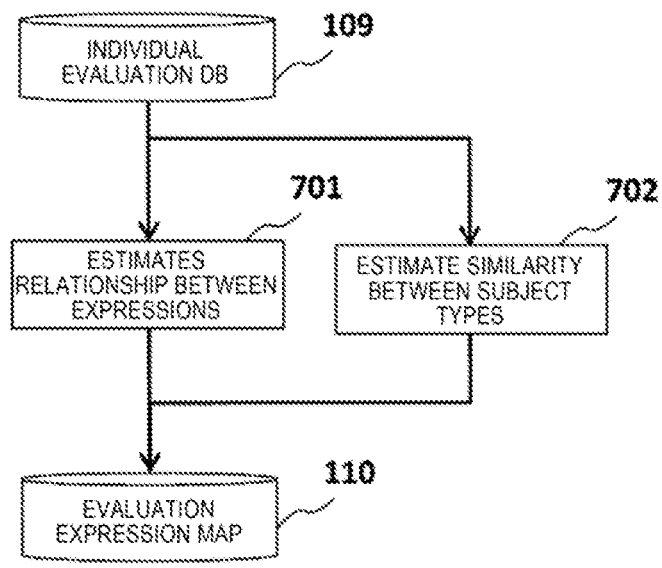
[Fig. 8]
| NAME | EVALUATION EXPRESSION | | | |
|---|---|---|---|---|
| HOTEL A | CLOSE TO STATION | GOOD LOCATION | LUXURIOUS | ... |
| HOTEL B | GOOD SCENERY | ABLE TO RELAX | CLOSE TO SEA | ... |
| HOTEL C | ... | ... | ... | ... |

[Fig. 9]
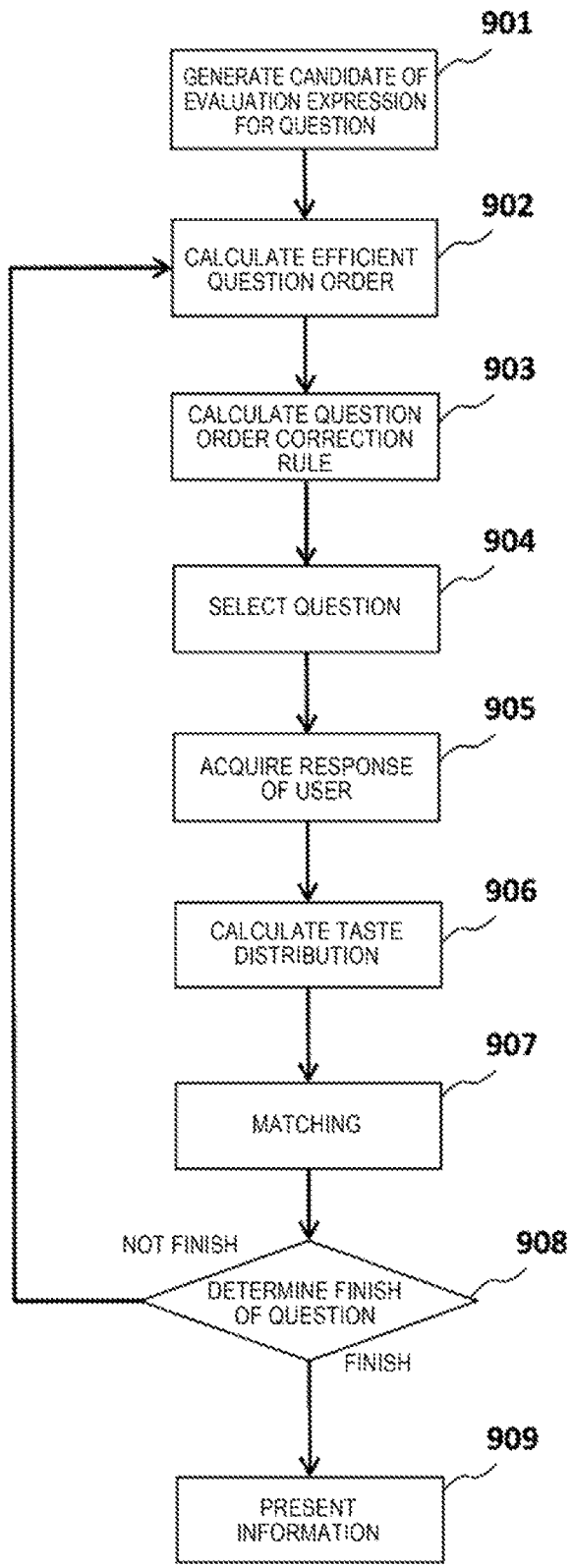

[Fig. 10A]

| HOTEL A | CLOSE TO STATION (29) | GOOD LOCATION (23) | LUXURIOUS (3) | ... |
|---------|----------------------|--------------------|---------------|-----|
| HOTEL B | GOOD SCENERY (15) | ABLE TO RELAX (8) | CLOSE TO SEA (13) | ... |
| HOTEL C | ... | ... | ... | ... |

|  | CLOSE TO STATION | ABLE TO RELAX | THERE IS OUTDOOR SPA |  |
|---|---|---|---|---|
| HOTEL A | ○ |  | ○ | ... |
| HOTEL B |  | ○ |  | ... |
| HOTEL C | ... | ... | ... | ... |

1002

INFORMATION PROCESSING SYSTEM AND INFORMATION PROCESSING METHOD

TECHNICAL FIELD

The present invention relates to techniques for presenting information to users.

BACKGROUND ART

As a method for presenting information that users seek, a method of searching information in which users are requested to input keywords such as words or phrases, and documents, web pages, parts of sentences, photographs, voices, product information, and the like which are highly relevant to the keywords are presented is being broadly used in order to extract information that users seek from a large amount of media information such as documents or images. In addition, there are techniques such as similarity searching and associative searching in which information including not only keywords that users input but also synonyms thereof and words that are highly relevant to the keywords is also searched as a subject to be searched.

In addition, methods in which information that users will request is estimated and presented on the basis of the history of other users showing actions similar to the action history (purchase history of product, watched history of movie, and the like) of the users are being broadly used as recommend techniques, and particularly, a method such as collaborative filtering is being used.

CITATION LIST

Non Patent Literature

NPL 1: "A survey of collaborative filtering techniques", Advances in Artificial Intelligence Volume 2009, January 2009, Article No. 4

SUMMARY OF INVENTION

Technical Problem

As a method for presenting information that users seek, there are recommend techniques in which information (products and the like) that users desire is estimated and presented on the basis of history information that the users referred to or searched in the past; however, in order to realize these techniques, it is necessary to acquire history information of the users in advance. Therefore, these techniques are inapplicable in a case in which little or no history information can be acquired. In addition, since the history information needs to be stored, there are cases in which these techniques are inapplicable from the viewpoint of personal information protection.

Solution to Problem

According to an aspect of the invention, there is provided an information processing system including a storing unit that stores evaluation data in which a plurality of subjects are associated with a plurality of evaluation expressions respectively and evaluation expression relationship data indicating relationships between the evaluation expressions, a question generating unit that generates and outputs questions on the basis of the evaluation data and the evaluation expression relationship data, and a matching unit that outputs information relating to the subject included in the evaluation data on the basis of responses when the responses with respect to the questions are input.

Advantageous Effects of Invention

According to the aspect of the invention, even in a case in which little or no history information of the user can be acquired, information that users seek can be searched and presented. The other problems, configurations, and effects will be apparent by description of the embodiments as follows.

BRIEF DESCRIPTION OF DRAWINGS

FIG. 1 is a functional block diagram illustrating an example of an information presentation system of an example.

FIG. 2 is a block diagram illustrating an example of a calculator constituting the information presentation system of the example.

FIG. 3 is a flow chart illustrating an example of processes being executed by a data collecting unit of the example.

FIG. 4 is a flow chart illustrating an example of processes being executed by an evaluation expression extracting unit of the example.

FIG. 5 is an explanatory view of an example of data being collected by the data collecting unit of the example.

FIG. 6 is an explanatory view of an example of data which is included in an individual evaluation DB of the example.

FIG. 7 is a flow chart illustrating an example of processes being executed by an expression map generating unit of the example.

FIG. 8 is an explanatory view of an example of evaluation expressions which are collected by the expression map generating unit of the example.

FIG. 9 is a flow chart illustrating an example of processes which are executed by a question-answering system of the example.

FIG. 10A is an explanatory view of an example of lists of candidates of evaluation expressions for questioning which are generated by a question-answering generating unit of the example.

FIG. 10B is an explanatory view of an example of information generated by the question-answering generating unit of the example, that indicates whether or not evaluations of each subject are suitable for each evaluation expression.

DESCRIPTION OF EMBODIMENTS

Examples of an information presentation system will be described with reference to drawings. The information presentation system of the example is a system which narrows down and presents information that users seek, based on question-answering with the user. Information of subjects to be searched are documents, images, voices, the other data, and the like.

FIG. 2 is a block diagram illustrating an example of a calculator constituting the information presentation system of the example.

A calculator 201 constituting the information presentation system of the example is provided with an inputting device 202, a displaying device 203, a communicating device 204, a calculating device (CPU) 205, and an external storing device 206.

The inputting device 202 is a keyboard, a mouse, and the like for inputting commands and the like. The inputting device 202 is a device for inputting commands which are executed in order to control connection devices, in addition to control programs being executed by the calculating device (CPU) 205.

The displaying device 203 is a device such as a display which appropriately displays contents of the processes.

The communicating device 204 is used for performing exchange of data from external devices such as PCs or servers. In detail, the communicating device 204 is used for purposes such as acquisition of executing commands by users from external devices, and acquisition of information of images, texts, or the like from the external devices. In addition, the communicating device 204 is also used for a purpose such as transmission of the contents of processes in the calculator 201 to external devices.

The calculating device (CPU) 205 is a calculating device that executes processes such as question-answering with users.

The external storing device 206 is an external storing device such as HDDs or memories. Data necessary for question-answering, data which becomes subjects to be searched, and the like are stored in an external storing device 207. In addition, the external storing device 206 is also used for temporally storing data or the like which is generated during a process being executed by the calculating device (CPU) 205.

The calculator 201 may not be provided with the inputting device 202, the displaying device 203, and the communicating device 204. In a case in which the inputting device 202 is not provided, commands and the like are input from external devices using the communicating device 204. In a case in which the displaying device 203 is not provided, a processed result is transmitted to the external devices using the communicating device 204.

Outputting and inputting of a module executing processes may be performed through the external storing device 206. That is, in a case in which a processing unit 1 (not illustrated) outputs a processed result to a processing unit 2 (not illustrated) and the processing unit 2 receives the processed result thereof as an input, in actual, the processing unit 1 outputs and stores the processed result in the external storing device 206, and the processing unit 2 may acquire the output result of the processing unit 1 stored in the external storing device 206 as an input.

Next, processes being executed by the information presentation system in the example will be described.

FIG. 1 is a functional block diagram illustrating an example of the information presentation system of the example.

The information presentation system of the example includes a knowledge database for questioning generating device 101, a database 107, a question-answering system 112, and a database 116. The knowledge database for questioning generating device 101 includes a data collecting unit 102, an evaluation expression extracting unit 103, and an expression map generating unit 104. The database 107 includes a collection database (DB) 108, an individual evaluation database (DB) 109, an evaluation expression map 110, and a domain knowledge database (DB) 111. The question-answering system 112 includes a question-answering generating unit 113, a user response acquiring unit 115, and a matching unit 114. The database 116 includes the individual evaluation DB 109 same as the database 107, the evaluation expression map 110, and a domain knowledge DB 111.

The information presentation system of FIG. 1 is realized by one or more calculators 201. For example, the knowledge database for questioning generating device 101 and the database 107 are realized by one calculator 201, and the question-answering system 112 and the database 116 may be realized by a separate calculator which is connected to through the calculator 201 and a network. In this case, the data collecting unit 102, the evaluation expression extracting unit 103, the expression map generating unit 104, the question-answering generating unit 113, the user response acquiring unit 115, and the matching unit 114 are realized when the calculating device 205 executes programs stored in the external storing device 206 of the respective calculator 201, and the database 107 and the database 116 are stored in the external storing device 206 of the respective calculator 201.

Otherwise, the information presentation system of FIG. 1 may be realized by one or more calculators 201. In a case, each unit of the knowledge database for questioning generating device 101 and the question-answering system 112 is realized when the calculating device 205 executes the programs stored in the external storing device 206 of one calculator 201. In addition, in this case, when the question-answering system 112 refers to the database 107, the database 116 can be omitted.

Otherwise, the database 107 is stored in the external storing device 206 of another calculator 201 different from those of the knowledge database for questioning generating device 101 and the question-answering system 112, the knowledge database for questioning generating device 101 and the question-answering system 112 may create and refer the database 107 through a network.

A configuration of the information presentation system of the example is not limited to an example described above. That is, an arbitrary part of the information presentation system of the example may be realized by the calculator 201 connected to a network, and may be realized by a virtual calculator which is generated by logically dividing one calculator 201.

Next, the knowledge database for questioning generating device 101 and the database 107 will be described. The domain knowledge DB 111 is a database which is created in advance, and includes information relating to a subject which becomes a theme (topic).

The domain knowledge DB 111 will be described. Here, an example of a case in which a trip is set as a theme will be described. For example, the domain knowledge DB 111 may include information relating to an ontology of concepts relating to a trip. As such information, for example, there are information relating to an is—a relationship, a part-of relationship, an instance-of relationship, and the like. For example, "hotel is—a accommodation" expresses that the hotel is an accommodation, "spa part—of hotel" expresses that the spa is a part of facilities of the hotel, "hotel A instance—of hotel" expresses that a hotel A is a specific instance of hotel concepts, and the like. Accordingly, information relating to a relationship between the concepts, facilities of each concept, specific instances of the concepts, and the like are organized. A method of organizing information other than the method of ontology may be used. Previous knowledge relating to a theme is maintained as the domain knowledge DB 111 using processes by a hand or a calculator in advance. In addition, the domain knowledge DB 111 may include data and the like relating to regulations which are used for extracting and classifying documents relevant to the theme using the data collecting unit 102.

The data collecting unit 102 collects document data (for example, web sites, questionnaires, or the other arbitrary types documents) which becomes a subject to be processed.

For example, in a case in which a recommend trip destination is presented, the data collecting unit 102 collects commercial facilities such as hotels, tourist facilities, or transportation facilities, homepages of public facilities, word-of-mouth communication, regional information, blogs, and the like. In a case in which there are information relating to questionnaires of customers and the like, the data collecting unit 102 also collects the information. In addition, in a case in which products are presented, the data collecting unit 102 collects sites, documents, and the like relevant to the products. The collected information are classified by types, and are stored in the collection DB 108.

A processing example of the data collecting unit 102 will be described. Here, a case will be described, in which, when a trip is set as a theme, it is assumed that a trip destination is presented to a user, and data is collected from the web.

FIG. 3 is a flow chart illustrating an example of processes being executed by the data collecting unit 102 of the example.

In a data collecting step 301, for example, the data collecting unit 102 collects information by crawling web or the like through a network connected to the communicating device 204. At this time, in a case of the trip, commercial facilities such as accommodation facilities, leisure facilities, souvenir shops, restaurants, and spas, public facilities such as community halls and transportation facilities, and word-of-mouth communication sites, blogs, information sites, and the like, where information relating to the facilities are disclosed, become subjects to be collected. It is omitted in FIG. 3, but the domain knowledge DB 111 may be used. For example, features of a page which becomes a subject to be collected are included in advance in the domain knowledge DB 111, and based on the features, the data collecting unit 102 collects the page. In the domain knowledge DB 111, for example, it is conceivable that features of sites where many keywords relevant to the trip are included, sites where information such as business hours or prices indicating commercial facilities are included, and the like are maintained.

In a tagging step 302, the data collecting unit 102 adds tags indicating types to these sites. For example, tags indicating types of facilities such as hotels, spas, or department stores, tags indicating locations, tags indicating classification of information sources such as word-of-mouth communications, blocs, or owner sites, and the like are conceived. Regulations of tagging are also maintained in the domain knowledge DB 111. By adding such a tag like this, it is possible to determine reliability, subjectivity, and the like of pages, for example, obtain more subjective expression information from the word-of-mouth communication information than owner pages. The reliability of the pages and the like are digitized and may be stored as an attribute.

The data collecting unit 102 may collect data from not only the web but also documents and the like in an organization and may add tags the data. The data collected and tagged by the data collecting unit 102 are stored in the collection DB 108.

Next, the evaluation expression extracting unit 103 will be described. The evaluation expression extracting unit 103 extracts evaluation expressions such as "spa in the hotel A is located with good scenery and I am able to relax" and the like from the collected data, and estimates attributes of an evaluator in a case in which the expressions are set to subjects to be evaluated and the subjects can be evaluation-expressed.

Also, a generation method of the collection DB 108 described above is an example, and even when the collection DB 108 generated by another method is used, processes of the example to be described later can be executed.

FIG. 4 is a flow chart illustrating an example of processes being executed by the evaluation expression extracting unit 103 of the example.

While the example of which a trip is a theme is appropriately described with reference to FIG. 4, processes of the evaluation expression extracting unit 103 will be described. Also, the domain knowledge DB 111 is referred as needed, but is omitted in FIG. 4.

In a layout analysis step 401, the evaluation expression extracting unit 103 analyzes a layout of a page (document) stored in the collection DB 108. In addition, meaning of each part of the page is analyzed. An example of the analysis will be described with reference to FIG. 5.

FIG. 5 is an explanatory view of an example of data collected by the data collecting unit 102 of the example.

The collected data will be described examples. A page 501 illustrated in FIG. 5 is an example of a page such as a word-of-mouth communication site of a hotel. A part 502 of an upper portion of the page 501 includes a names of a hotel, and a part 503 of a lower portion thereof includes evaluation scores of all word-of-mouth communications, explanatory texts relating to the hotel, and the like. A part 504 of a lower portion thereof displays evaluations of the hotel (so called word-of-mouth communication) written by users who respectively uses the hotel. The evaluation score displayed on the part 503 may be displayed in each word-of-mouth communication. In addition, there are various layouts, for example, advertisement or information relating to the relevant facilities is displayed on a right side or a lower side of the page 501.

In the layout analysis step 401, the evaluation expression extracting unit 103 analyzes the layout of the page 501, and estimates meaning of each part (the part 502 is a title, the part 504 is a word-of-mouth communication, the part 503 is explanatory texts and evaluation scores, and the like). Regulations, keywords, and the like for estimating the layout are maintained in advance in the domain knowledge DB 111, and the evaluation expression extracting unit 103 refers to the database. For example, the part 502 can be determined as a title because the part is in an upper portion of a page and a font thereof is large. In addition, the title can be determined as a name of the hotel because keywords representing concepts relevant to the hotel are well expressed in a body of the page, even if a words like a hotel such as "hotel A" is not included therein. The concepts are maintained in the domain knowledge DB 111.

In addition, since the evaluation scores in the part 503 and evaluation sentences in the part 504 appear in multiple times, it is possible to estimate that the page is a word-of-mouth communication site. In a case of a web page, the page is structured, and thus a layout structure can be extracted using HTML tags and the like. In a case of a general document, a layout analysis technique being used for processing documents may support the layout analysis step 401.

In an evaluation sentence extracting step 402, as a result of the layout analysis, the evaluation expression extracting unit 103 extracts a part where the evaluation sentences are described. In an example of the word-of-mouth communication site described above, the evaluation sentences are described in the part 503 or the part 504. The evaluation sentence means a sentence in which expressions such as "XX is beautiful" evaluated something is included. However, a subject to be evaluated (a part of "XX" in this example) may not be clearly specified. Since the evaluation may be mainly expressed using adjectives, for example, when a list of adjectives being used as evaluation expressions is maintained in advance in the domain knowledge DB 111, and a sentence including any one of the adjectives is extracted, the evaluation expression can be extracted. In addition, since there are evaluation expressions ("I really was able to relax in a spa", and the like) which cannot expressed using adjectives, features (regulations) of the evaluation expressions may be determined on the basis of a syntax analyzed result. Otherwise, a polar analysis technique may also be used.

In an evaluation expression extracting step 403, the evaluation expression extracting unit 103 extracts evaluation expressions from sentences extracted in the evaluation sentence extracting step 402. For example, in an example of a sentence "A hotel C provides a delicious meal, and I am able to relax because a bed is wide. There is also an outdoor spa, and therefore, I recommend the hotel.", "delicious", "wide", "able to relax", and "recommend" are the evaluation expressions.

In an evaluation subject specifying step 404, the evaluation expression extracting unit 103 extracts an evaluation subject of evaluation expressions expressed by the evaluation expression extracting step 403. In the example described above, in a case of "A hotel C provides a delicious meal" and the like, it is known that "meal of the hotel C" is evaluated as "delicious" by an analysis of dependence or the like. However, as an example described in the evaluation sentence extracting step 402, there is a case in which a subject is not clearly specified in the sentence (for example, a case in which there is not "hotel C is", and the like). In such a case, the evaluation expression extracting unit 103 estimates the evaluation subject from surrounding information. For example, in a case of the word-of-mouth communication site, since there is a case in which a name of facility which becomes evaluation subjects, a product name, and the like are disclosed in a title or the like, and thus the evaluation subject is estimated from the title or the like.

In an evaluator attribute estimating step 405, the evaluation expression extracting unit 103 estimates attributes of an evaluator in the sentence. The attributes of the evaluator are, for example, a peripheral status (premise of evaluation) of the evaluator, which is read from a sentence, such as going with a family or using a car in a case of a trip. In addition, there is also an attribute such as a degree of professionalism of the evaluator with respect to the subject. For example, in a case of evaluations and the like of products such as digital cameras, each evaluation of a person who is familiar with photographs and a person who does not, is different from one another. Therefore, it is assumed that the person who is familiar with photographs does not helpful to a person who does not familiar with photographs (does not persistence to the photograph that much) and looks for a camera which is cheap and used for easily taking photos.

As described above, if the evaluators set as groups in accordance with professionalism and strong persistence of a person who written the evaluations, it is useful when preference of the user is estimated. A degree of professionalism can be used to analyze and determine features that keywords with high professionalism are shown in a sentence, and the expression is highly specified. However, the evaluator attribute estimating step 405 may be omitted. Particularly, the step may be omitted with respect to a document in which the evaluator is difficult to be estimated.

In the individual evaluation DB 109, an individual subject such as the hotel A and the hotel B and evaluation expressions thereof are organized and stored. In addition, in a case in which the evaluator attributes are also estimated, the attributes are organized as a database.

FIG. 6 is an explanatory view of an example of data included in the individual evaluation DB 109 of the example.

Also, in a case in which diverse expressions are included in the extracted evaluation expression, such diverse expressions are corrected, and normalized evaluation expressions may be stored in the individual evaluation DB 109. For example, all of "delicious", "good taste", "tasty", and the like may be recorded in the individual evaluation DB 109 to put together into an evaluation expression such as "delicious".

In data 601 of FIG. 6, information relating to the individual subject, such as an ID 601A of an individual subject, a subject type 601B and a name 601C thereof are included. Illustration thereof is omitted, but other than these, information which can be acquired such as an address of a web page and the nearest station are included in the data 601 and can be stored in the individual evaluation DB 109.

In data 602 of FIG. 6, an evaluation expression 602B with respect to the individual subject which is identified by a subject ID 602A is included. The same subject ID and the same evaluation expression may occur in multiple times. In a case in which an evaluator type can be estimated, an ID 602C of the evaluator type thereof is included in the data 602 and can be stored in the individual evaluation DB 109. As described above, in a case in which the evaluator type is not estimated, the evaluator type ID 602C may be omitted. In addition, in a case in which a plurality of types with respect to one evaluator are estimated, or in a case in which same evaluation expressions are given the same subjects by a plurality of evaluators of different types, a plurality of values may be included as the evaluator type ID 602C with respect to the subject and the evaluation expression.

Also, in a case in which tags indicating types of documents collected in the step 302 of FIG. 3 are added, the data 602 may further include tags indicating types of documents in which each evaluation expression is extracted. In a case in which one evaluation expression is extracted from documents of a plurality of types (for example, page of owner site, blog page of user, and the like), tags indicating the plurality of types correspond to the evaluation expression.

In data 603 of FIG. 6, an ID 603B of a subject accompanied with the individual subject ID 603A is included. In an example of FIG. 6, both of the hotel A being identified as a subject ID "001232" and a restaurant B being identified as a subject ID "0823181" are subjects included in the data 601; however, since the restaurant B is a facility accompanied with the hotel A, "0823181" is maintained as the accompanied subject ID 603B corresponding to the subject ID "0012327". The accompanied subject ID 603B which corresponds to a subject without a subject to be accompanied with is empty, and IDs of the plurality of subjects are maintained as the accompanied subject ID 603B in a case in which a plurality of subjects are accompanied with one subject.

In data 604 of FIG. 6, an evaluator type ID 604A and an attribute 604B included in the evaluator type are included. The evaluator type may occur in multiple times. In addition, as the professionalism of the example, displaying attributes as numerals is included.

Accordingly, evaluation, information, a type of evaluator, and the like with respect to an individual subject are stored in the database.

Next, the expression map generating unit 104 will be described. The expression map generating unit 104 analyzes a relationship between evaluation expressions used in each subject type. In the evaluation expressions, the expression being used to each subject may be different from meaning thereof. For example, an evaluation expression called "simple" with respect to a ramen is barely used to facilities such as a hotel. In addition, meaning of evaluation such as "simple" with respect to a person is different. Therefore, it is necessary to analyze which evaluation expression is used and how to use the evaluation expression in each subject type. In this example, a similarity relationship, an inclusion relationship, a trade-off relationship, and the like between evaluation expressions are analyzed.

FIG. 7 is a flow chart illustrating an example of processes being executed by the expression map generating unit 104 of the example.

In a relationship between expressions estimating step 701, the expression map generating unit 104 collects evaluation expressions being used for evaluating each subject type, and analyzes a similarity relationship, an inclusion relationship, a trade-off relationship, and the like between the expressions.

An example of processes of the relationship between expressions estimating step 701 will be described. The expression map generating unit 104, first, collects evaluation expressions of each subject in each subject type.

FIG. 8 is an explanatory view of an example of evaluation expressions collected by the expression map generating unit 104 of the example.

An evaluation expression 801 of FIG. 8 is a table in which evaluation expressions in each subject with respect to the subject type "hotel" are organized. In each row, one or more evaluation expressions 801B with respect to one subject including a name 801A are listed.

The expression map generating unit 104, first, quantifies similarity between evaluation expressions. Here, an example thereof will be described. There are two evaluation expressions E1 and E2. At this time, the expression map generating unit 104 calculates a distance D (E1, E2) between E1 and E2. In following description, the number of elements of an aggregation S is displayed as #|S|. When aggregation of the subject indicated by an evaluation expression E1 is set to O (E1), and aggregation of the subject indicated by an evaluation expression E2 is set to O (E2), it is considered that the evaluation expressions E1 and E2 are similar to each other, as a frequency of which the evaluation expression E1 and the evaluation expression E2 occur at the same time (co-occur) is great. For example, in a case in which both of the evaluation expressions E1 and E2 are included in an evaluation expression 801B of the same subject (for example, the hotel A), the expression map generating unit 104 determines that the expressions co-occur, and in a case in which one of the expressions is included therein, the expression map generating unit determines that the expressions does not co-occur, and the expression map generating unit 104 determines whether or not the same evaluation expressions E1 and E2 co-occur with respect to all subjects corresponding to the subject type "hotel", and calculates frequencies of co-occurring from a determined result thereof. A distance between the evaluation expressions can be defined by, for example, Equation (1).

$$D(E1,E2)=\text{Log}[(2\times \#|O(E1) U O(E2)|)/(\#|O(E1) \cap O(E2)|+\#|O(E1) U O(E2)|)] \quad (1)$$

With respect to a subject in which at least one of evaluation expressions E1 and E2 occurs, D (E1, E2) becomes 0 in a case in which both of the E1 and E2 surely occur (that is, co-occur), and becomes Log 2 in a case in which both of them do not co-occur. Further, a frequency at which the evaluation expression E occurs as an evaluation expression of a subject K is set to F(K, E). At this time, since the E1 and E2 can be estimated to be similar to each other as a frequency F (K, E1) and a frequency F (K, E2) of which the E1 and E2 occur are similar to each other, these can be estimated, and thus Equation (2) may be used as a separate example of calculation of the distance D(E1, E2).

$$D(E1,E2)=\Sigma[(|F(K,E1)-F(K,E2)|)/(|F(K,E1)|+|F(K,E2)|)] \quad (2)$$

Here, a sum ($\Sigma$) is calculated with respect to all of the subjects K of the subject type which are considering now. Here, in a case in which Equation (3) is satisfied, a term with respect to the K is set to 0.

$$|F(K,E1)+F(K,E2)|=0 \quad (3)$$

Two examples are described above, but two references of the examples may be combined. Accordingly, a distance between the evaluation expressions can be quantified on the basis of a co-occurring frequency of the evaluation expressions E1 and E2, a similarity of occurrence frequencies of the E1 and E2, and the like as a function.

Next, an example of quantifying an inclusion relationship will be described. For example, regarding two expressions such as "close to a station" and "3 minutes from the station", the former is more abstract, and the latter is more specified. In addition, if the 3 minutes from the station can be analyzed as being close to the station, it is thought that an expression of the former includes an expression of the latter. The expression map generating unit 104 estimates such an inclusion relationship between the expressions. Regarding a degree of the evaluation expression E2 being included in evaluation expression E1, in the evaluation expression 801B of the subject K, when there are cases in which the evaluation expression E1 occurs if the evaluation expression E2 occurs (in other words, in a case in which frequencies of which the evaluation expressions E1 and E2 co-occur satisfy a predetermined condition, a frequency of which the E1 only occurs is higher than a frequency of which the E2 only occurs, with respect to a subject in which the evaluation expressions E1 and E2 do not co-occur), it is estimated that a ratio at which the evaluation expression E2 is included in the evaluation expression E1 is great. Here, the expression map generating unit 104 calculates Equation (4) with respect to evaluation expression E (for example, each of E1 and E2).

$$F(E)=\Sigma F(K,E) \quad (4)$$

Here, $\Sigma$ is calculated with respect to all of the subjects K of the subject type being considered. Further, the expression map generating unit 104 calculates P(K, E) using Equation (5).

$$P(K,E)=F(K,E)/F(E) \quad (5)$$

The P(K, E) can be seen as a probability distribution of the evaluation expression E when the K is considered as an variable number. Here, the expression map generating unit 104 calculates, for example, negative Kullback-Leibler information feature amounts I(E1, E2) of P(K, E1) and P(K, E2) using Equation (6), and thus it is possible to quantifies a degree of the evaluation expression E2 being included in the evaluation expression E1. The degree becomes a large number in a case in which the E1 also occurs with high probability when the E2 occurs.

$$I(E1,E2)=-KL(E2\|E1)=-\Sigma p(K,E2)\text{Log}[p(K,E2)/p(K,E1)] \quad (6)$$

Also, the expression map generating unit 104 may estimate a similarity relationship and an inclusion relationship between the evaluation expressions using a thesaurus dictionary and a dictionary showing the inclusion relationship.

Next, the expression map generating unit 104 quantifies a trade-off relationship between the evaluation expressions. For example, "luxurious", "cheap", and the like easily become the trade-off relationship. Such a relationship can be acquired from expressions in language representing an adversarial relationship like "luxurious but cheap" from the evaluation expression using a synonym dictionary. In addition, evaluation expressions which becomes the trade-off relationship may not easily co-occur, and an inverse number T(E1, E2) of D(E1, E2) defined above using Equation (7) may be calculated.

$$T(E1,E2)=1/D(E1,E2) \tag{7}$$

As described above, the expression map generating unit 104 analyzes the similarity relationship, the inclusion relationship, and the trade-off relationship between the evaluation expressions. The analyzed result is stored in the evaluation expression map 110. Specifically, information a degree of similarity D(E1, E2), a degree of inclusion I(E1, E2), a trade-off degree T(E1, E2), and the like between the expressions are stored in the evaluation expression map 110. As described above, information such as synonym may be stored as information indicating the trade-off relationship.

In a similarity between subject types estimating step 702, the expression map generating unit 104 shares analyzed result of the relationship between the evaluation expressions with the similar subject types. Processes of the relationship between expressions estimating step 701 are executed in each subject type. However, since similar subject types, for example, "hotel" and "inn" are similar to each other, it is expected that the relationship analyzed result between the evaluation expressions respectively relating to the similar subject types can be diverted to each other.

Here, an example of a calculation method of a degree of similarity S(O1, O2) between two subject types O1 and O2 will be described. With respect to all subject of the O1, the occurrence frequency of the evaluation expression E is set to F(O1, E). At this time, the expression map generating unit 104 calculates P(O1, E) using Equation (8).

$$P(O1,E)=F(O1,E)/\Sigma F(O1,E) \tag{8}$$

Here, the sum ($\Sigma$) is calculated with respect to all of evaluation expressions E. At this time, the P(O1, E) can be seen as a probability distribution when the E is set to a random variable number. Here, the expression map Generating unit 104 calculates a distance L(O1, O2) of the probability distributions P(O1, E) and P(O2, E). As the distance, Kullback-Leibler distance, and the like can be used. Since the subject types of which the appearance frequencies of the evaluation expressions E are similar are considered to be similar to each other, the degree of similarity S(O1, O2) is defined as, for example, Equation (9).

$$S(O1,O2)=16/(L(O1,O2)+1) \tag{9}$$

Accordingly, a degree of similarity can be measured on the basis of how to use evaluation expressions between the subject types O1 and O2, and whether use frequencies thereof are similar to each other.

The expression map generating unit 104 is capable of redefining a degree of similarity (or distance), an inclusion relationship, and a trade-off relationship between the evaluation expressions using a degree of similarity between the subject types as measured above. For example, a distance D(O1; E1, E2) between the evaluation expression E1 and the evaluation expression E2 in the subject type O1 is defined by a method of the relationship between expressions estimating step 701. At this time, a distance between the evaluation expressions in the subject type O1 can be redefined like, for example, Equation (10).

$$D'(O1;E1,E2)=\Sigma S(O1,O)D(O;E1,E2) \tag{10}$$

Here, the sum ($\Sigma$) with respect to all of the subjects types O is calculated. A distance between the evaluation expressions of another subject type is shared as weight of the degree of similarity S between the subject types. Also, the sum with respect to all of the subjects types O is calculated in the example described above; however, a sum with respect to only a preset subject type, or only a subject type of which a degree of similarity is equal to or more than a certain degree may be calculated. The same process may be applied to the inclusion relationship and the trade-off relationship. In addition, in a case in which evaluation expressions in each subject type is sufficiently obtained, the expression map generating unit 104 may not execute the similarity between subject types estimating step 702, but a relationship between the evaluation expressions can be shared by executing the process on a certain subject type in a case in which the evaluation sentences are small and is not sufficiently obtained.

In the example described above, the relationship between the two evaluation expressions is analyzed; however, it is convenient that the evaluation expressions are expressed as vectors, and the evaluation expressions are described as a point on a vector space. Therefore, the evaluation expressions may be converted into a vector, so that the expressions of which the degree of similarities are high are disposed on the vector space. As an example of such a method, a method of Force-Directed Algorithm or the like can be used. In this method, predetermined repulsive forces among all of elements is defined, attractive forces acting between the elements are defined on the basis of a degree of similarity between the elements, and disposing of the elements are sequentially corrected so that energy of the entire system is reduced on the basis of the attractive force and repulsive force, and positions of the elements are determined when the elements are disposed to be converged. Accordingly, the elements having a high degree of similarity are disposed to be close to each other on the vector space. The expression map generating unit 104 converts the evaluation expressions described above into vectors, and stores the obtained vector space and values of the vectors in the evaluation expression map 110 as a map of the degree of similarity. In the same manner, the vector space can also be determined with respect to the inclusion relationship and the trade-off relationship.

Next, the question-answering system 112 of FIG. 1 will be described. The question-answering system 112 asks a taste of a user based on questions to the user and responses of the user with respect to the questions, narrows down subjects similar to the taste of the user by matching, and presents the results to the user. The question-answering system 112 uses the individual evaluation DB 109 and the evaluation expression map 110 generated by the knowledge database for questioning generating device 101.

The question-answering generating unit 113 estimates the taste of user by generating questions using evaluation expressions and repeating processes in which responses from the user are obtained.

FIG. 9 is a flow chart illustrating an example of processes being executed by the question-answering system 112 of the example.

Processes from steps 901 to 904 are processes of the question-answering generating unit 113, processes in step 905 are processes of the user response acquiring unit 115, and processes in steps 906 to 909 are processes of the matching unit 114.

First, in a candidate of evaluation expression for question generating step 901, the question-answering generating unit 113 generates an evaluation expression candidate list for questioning in each subject type.

FIG. 10A is an explanatory view of an example of the evaluation expression candidate list for questioning generated by the question-answering generating unit 113 of the example.

An evaluation expression candidate list 1001 illustrated in FIG. 10A is a list where occurrence frequencies of evaluation expressions in each subject are organized. In an example of FIG. 10A, the numbers in parentheses under the evaluation expressions respectively indicate an occurrence frequency of the evaluation expressions thereof. Here, the question-answering generating unit 113 removes expressions of which the appearance frequency is small as the evaluation expressions, and creates a list of the evaluation expression of which the appearance frequency is equal to or more than a certain frequency. Further, the question-answering Generating unit 113 also adds evaluation (for example, "there is an outdoor spa", "there is a restaurant", and the like) relating to presence or absence of facilities and equipments to the evaluation expression candidate list 1001. Information thereof, for example, can be acquired from owner pages of the subject such as a hotel stored in the collection DB 108.

In a subsequence process, the question-answering generating unit 113 Generates a question such as "do you prefer a hotel close to a station?" based on the evaluation expression. The user response acquiring unit 115 receives a response of a natural language sentence from a user, or presents the response as an option (for example, "a closer place may be good", "if it is possible", "it does not matter" "if it is possible, I prefer a distant place" "I prefer the distant place", and the like), and receives selection of the user with respect to the options as a response, the matching unit 14 narrows down a subject matching a taste of the user based on the received response.

In an efficient question order calculating step 902, the question-answering generating unit 113 presents an order of efficient questions. An example of processes thereof will be described. First, the question-answering generating unit 113 remains expressions which are estimated as being suitable for a subject with high accuracy among evaluation expressions with respect to each subject of the evaluation expression candidate list 1001, and excludes expressions other than these. A degree of accuracy can be calculated on the basis of, for example, a high degree of appearance frequencies of the evaluation expressions, and a low degree of appearance frequencies of the evaluation expressions which are opposed thereto (that is, a degree of a trade-off relationship is large).

For example, as co-occurring frequencies of a certain evaluation expression and an evaluation expression opposed thereto are high, the question-answering generating unit 113 may determine that the accuracy of the evaluation expression is low. In addition, since presence and absence of facilities and equipments, and the like can be acquired from owner pages or the like, the accuracy is considered to be high. Accordingly, the question-answering generating unit 113 may give a preset accuracy (or weight of accuracy) in accordance with types of documents (for example, owner pages, a person's blog, or the like) respectively extracted, to each evaluation expression. Here, the question-answering Generating unit 113 creates information indicating whether or not the evaluation of each subject is suitable with respect to each evaluation expression.

Even when questions based on evaluation expressions with low accuracy are output and responses of a user with respect to the questions are obtained, it is considered that subjects suitable for the user are not narrow down. The subjects can be efficiently narrowed down by outputting only questions based on the evaluation expression with high accuracy as described above.

FIG. 10B is an explanatory view of an example of information indicating whether or not the evaluation of each subject is suitable with respect to each evaluation expression, which is generated by the question-answering generating unit 113 of the example.

In an example of FIG. 10B, a symbol "o" is disclosed in a case in which the evaluation of each subject is suitable with respect to each evaluation expression. A table 1002 indicating whether or not the evaluation of each subject is suitable with respect to each evaluation expression indicates that, for example, the hotel A is determined as being "close to a station" with high accuracy. In addition, a table 1002 indicates that accuracy of evaluation such as "able to relax" regarding the hotel A is low or none.

In the efficient question order calculating step 902, the question-answering generating unit 113 repeats questions to a user, and calculates an order of questions which are estimated to be efficient when the numbers of candidates matching with responses of the user are narrowed down as a threshold set in advance or lower. For example, in order to calculate an order of efficient questions, the question-answering generating unit 113 generates an order of questions so that questions which can be excluded by many candidates are firstly output, in a case in which, it is assumed that responses with respect to the questions based on evaluation expression as described above are determined as only being "Yes" and "No" although a certain response is obtained.

For example, it is assumed that, if a response is "Yes" with respect to a question "do you prefer a hotel close to a station?", the hotel A is remained as a candidate, and if the response is "No", the hotel B may be remained as a candidate. With respect to this question, for example, if a sum of the number of candidates which are excluded in a case in which the response is "Yes" and the number of candidates which are excluded in a case in which the response is "No" is great, it is considered to be efficient for narrowing down the candidates. Accordingly, the question-answering generating unit 113 prioritizes the questions which are considered as being efficient so as to quickly output the questions, and calculates the evaluation expressions which are basis of high-ranked questions of a preset number. A value used for prioritizing the questions (here, sum of the number of candidates) is set to a score.

Specifically, the question-answering generating unit 113 estimates the number of subjects not corresponding to responses from the questions based on each evaluation expression (that is, excluded by the responses thereof), and calculates a score based on the number of the estimated subjects (for example, in order to quickly output the questions based on the evaluation expressions of which the number thereof satisfies a predetermine condition). For example, the question-answering generating unit 113 may calculate a score based on relationships of the number of all subjects, the number of subjects corresponding to the evaluation expression "close to a station", and the number of subjects corresponding to an evaluation expression (for example, "distant away from a station") which has a trade-off relationship with the evaluation expression.

For example, with respect to the number of all subjects, a ratio of the number of objects not corresponding to neither of the evaluation expressions "close to a station" nor "distant way from a station" is great, it means that a ratio of subjects which cannot be excluded from the candidates even when a response with respect to a question "do you prefer a hotel close to a station?" is "Yes" or "No" is great. In addition, for example, in a case in which either of the number of subjects corresponding to the evaluation expression "close to a station" or the number of subjects corresponding to "distant away from a station" is extremely small, there are few subjects which can be excluded from candidates in a case in which a response is one of "Yes" or "No", and there are few subjects which remain as a candidate in a case in which the response is another one thereof.

When an efficiency of narrowing down candidates of subjects to be presented to a user is considered, it is preferable that a subject which is not accepted by the user is early excluded from the candidates, but it is not preferable that a subject which has a possibility of being accepted by the user is early excluded from the candidates, and thus it is not preferable that asking the user questions based on the evaluation expressions described above is performed if many candidates still remain at that time. Therefore, for example, the question-answering generating unit 113 may output a score of the respective evaluation expression, so that the other questions are output earlier than questions based on evaluation expressions in which a ratio of the subjects corresponding to none of expressions opposed to the evaluation expressions is greater than a predetermined value, and questions based on evaluation expressions in which the number of subjects corresponding to responses of one side is smaller than a predetermined value. Accordingly, the subjects can be efficiently narrowed down.

In a question order correction rule calculating step 903, the question-answering generating unit 113 generates an order of questions in consideration of not only efficiency of narrowing down but also naturalness of a conversation. In the conversation, it is natural to ask the questions having broad (for example, abstract or vague) expressions, and then ask specific questions little by little, rather than asking specific questions at first. In addition, there is a case in which a user changes his or her mind during the conversation, or the user makes mistakes in responses. Further, since the user may ask requests which are difficult to be compatible with each other in the trade-off relationship, for example, "hotel in cheap price", "hotel with a large room", and the like, it is necessary to adjust such as compromise any request of the user.

Here, in the question order correction rule calculating step 903, the Question-answering generating unit 113 corrects a priority of the questions obtained in the efficient question order calculating step 902 based on a similarity relationship, an inclusion relationship, and a trade-off relationship between the evaluation expressions. At this time, the question-answering generating unit 113 uses the evaluation expression map 110.

Hereinafter, an example of processes will be described. The question-answering generating unit 113 expresses a result of responses of the user so far as a vector in consideration of the vector, in which the evaluation expression is set to an element. The vector of the result of the responses is set to $v=(v1, \ldots, vn)$ (n is the number of the evaluation expressions). For example, v1 indicates a result of a response corresponding to the evaluation expression "close to a station". At first, all of the elements are set to 0. The question-answering generating unit 113 creates the vectors thereof in each subject type. For example, if five responses "I absolutely prefer the hotel close to the station", "I prefer if it is possible", "it doesn't matter", "it is okay if the hotel is distant away from the station", and "I prefer a hotel distant away from the station" with respect to a question "do you prefer a hotel close to a station?" are prepared, the responses are respectively set to v1=1.0, v1=0.5, v1=0.0, v1=−0.5, v1=−1.0 by corresponding to each response in accordance with the response of the user. In description hereinafter, when two evaluation expressions are similar to each other, it indicates that a degree of similarity between the evaluation expressions are equal to or more than a preset threshold, and when the evaluation expression E1 is included in the evaluation expression E2, it indicates that a degree of inclusion are equal to or more than a preset threshold.

The question-answering generating unit 113 maintains such a vector, and increases a score of E2 in accordance with the degree of inclusion, in a case in which, regarding the evaluation expressions E1 and E2 obtained in the efficient question order calculating step 902, E2 includes E1 so that E2 is lower-ranked than E1, and E2 is not used for a question yet. Accordingly, a question with high abstraction level which is not asked yet tends to be high-ranked. As a result, in the example described above, the questions based on the evaluation expression E2 are easily output earlier than the questions based on the evaluation expression E1.

Further, as a result of excluding subjects which are not suitable for responses obtained with respect to the questions so far, in a case in which the number of subjects to be presented to the user is decreased, the question-answering generating unit 113 may ask questions using evaluation expressions similar to the questions which are already asked. As the question, it is assumed that the user changes his or her mind, a question having the evaluation expression of the changed mind is set to the similar question. Therefore, even the evaluation expressions not exemplified in the efficient question order calculating step 902, with a certain regulation (for example, in random), an order of the questions of evaluation expressions which occur in a question of the past and evaluation expressions similar thereto is advanced (for example, is on the uppermost at this time).

In a question selecting step 904, the question-answering generating unit 113 performs asking questions in which the uppermost evaluation expressions at the time of finishing the question order correction rule calculating step 903 are used. For example, in a case in which an evaluation expression "close to a station" is selected with respect to a subject such as a hotel as the uppermost evaluation expression, the question-answering generating unit 113 outputs questions such as "do you prefer a hotel close to a station?" and the like.

Also, in the examples described so far, the example of which the subject type is fixed as an example of the hotel is described; however, the question-answering generating unit 113 may perform the processes of the candidate of evaluation expression for question generating step 901, the efficient question order calculating step 902, and the question order correction rule calculating step 903 with a plurality of the subject types, and may generate questions by selecting a subject type with a certain regulation among the processes in a question selecting step 904.

In a response of user acquiring step 905, the user response acquiring unit 115 acquires responses from the user. The user response acquiring unit 115 may acquire responses described in a natural language, and may acquire selection of the user as a response from prepared responses when a plurality of default responses are prepared. In a case in which the responses in the natural language are acquired, the user response acquiring unit 115 calculates and digitizes a degree of positive or negative (for example, value as v1=1.0 to −1.0 in example described above) with respect to the responses based on the expressions of the user, and stores the degree as an element of the vector.

In a taste distribution calculating step 906, the matching unit 114 expresses the result of the responses as a numeral. For example, the result may be expressed as the vector of the result of the responses and the like described above.

In a matching step 907, the matching unit 114 selects candidates matching with the result of the responses of the user. An example of calculating a degree of coincidence with the result of the response of the user will be described. For example, the matching unit 114 expresses each subject using a vector of which each element corresponds to each evaluation expression in the same manner as the vector of the result of the responses, and the subject is expressed as 1 in a case in which there are evaluation expressions, and is expressed as 0 in a case of none evaluation expressions. For example, when the vector of the hotel A is set to w= (w1, . . . wn), in a case in which a first element w1 an evaluation expression corresponding to "close to a station", there is "close to a station" as an evaluation expression corresponding to the hotel A, it satisfies w1=1, or if not, (or if there is an evaluation expression like "distant away from a station" which has the trade-off relationship with the above evaluation expression), it satisfies w1=0.

For example, accuracy of each evaluation item corresponding to each subject illustrated in FIG. 10B may become an element of a vector of the evaluation expression corresponding to each subject. In an example of FIG. 10B, among the elements of the vectors of the evaluation expressions of the hotel A, a value of the element corresponding to the evaluation expression "close to a station" is "1", and a value of the element corresponding to the evaluation expression "is able to relax" is "0".

Also, the matching unit 114 calculates a degree of similarity between the vector generated form an evaluation expression corresponding to each subject and the vector of the result of the responses, and determines that a subject in which the degree of similarity is equal to or more than a certain value is matched with the result of the responses of the user. In calculation of the degree of similarity between the vectors, various methods are used, and for example, a cosine degree of similarity and the like can be used. As described above, a subject matching with the result of the responses of the user as described above in each subject type can be selected.

However, at this time, the matching unit 114 is required to narrow down compatible candidates in another subject types. For example, in a case of considering that a trip plan is presented, when there are two subject types of "hotel" and "tourist destination (location)", a location of the hotel A matching with the result of the responses of the user and a location of a tourist destination matching with the result of the responses of the user need to be same or similar with each other. Here, the matching unit 114 creates a combination of the compatible candidates as a plan, when the subject in each subject type is selected as a candidate, and calculates the created combination as a candidate.

Also, at this time, in the value of the vector of the result of the responses, the value is given to the element corresponding to an evaluation expression in which a response is obtained from the user, but both of them may share the responses in accordance with the degree of similarity thereof, in a case in which there is also a value with respect to a similar evaluation expression, even regarding the element corresponding to an evaluation expression in which a response is not obtained from the user. For example, when a value of an element of an evaluation expression E' similar to a certain evaluation expression E is set to v, and the value of the element of the evaluation expression E may be set to v*s when a degree of similarity between the expressions is s (s is normalized so as to be between 0 and 1).

In addition, as illustrated in FIG. 6, in a case in which information indicating attributes of an evaluator who uses each evaluation expression is included in the individual evaluation DB 109, the matching unit 114 may select a subject matching with responses of the user in consideration of the attributes. Specifically, for example, in a case in which the attributes of the evaluator suitable for a user who responses are found, the matching unit 114 weights an appearance frequency of each evaluation expression, so that the weight of the appearance frequency of the evaluation expressions used by the evaluator in the attributes is more increased, generates a vector of the evaluation expressions corresponding to each subject based on the appearance frequency of the weighted evaluation expressions, and may calculate a degree of similarity between the generated vector and a vector of the result of the responses. The attributes of the evaluator suitable for the user may be designated by the user himself or herself (for example, the user wants to take a serious view of evaluations of a person who has high professionalism, wants to take a serious view of evaluations of a person who tripped with a family or the like), and the question-answering system 112 may estimate the attributes based on the responses input by the user. Accordingly, a subject more suitable for the user can be presented.

In addition, in a case in which information indicating types of documents of which each evaluation expression is extracted are included in the individual evaluation DB 109, the matching unit 114 is capable of performing processes same as the processes relating to the attributes of the evaluator described above with respect to the types.

In a question finish determining step 908, the matching unit 114 determines whether or not the questions are finished. In a case in which the questions are not finished, this process moves to the efficient question order calculating step 902, and the questions are regenerated. In a case in which the questions are finished, the process moves to an information presenting step 909. For example, the matching unit 114 determines whether or not candidates of the subjects matching with a predetermined reference with the result of the responses of the user are present, and in a case in which the number of the candidates are equal to or less than a predetermined number, the matching unit may determine that the question is finished.

In an information presenting step 909, the matching unit 114 presents the candidates of the subject matching with the responses of the user through the displaying device 203. The matching unit 114 may present a plurality of candidates, and may present a candidate with the highest degree of coincidence. In addition, the matching unit may present candidates in each subject type, and may present a combination (plan) of the subject types, for example, the hotel A and the restaurant A.

Also, for example, in a case of a trip, a trip plan or a tour in a set of hotels, transportation facilities, restaurants, and the like may be provided in advance. At this time, a plan or a tour matching with the taste of the user from the result of the responses of the user may be desired to be presented. At this time, an evaluation tag is added to the tour, plan, or the like in advance, and the question-answering system 112 may present a plan or a tour with a high degree of similarity by measuring the degree of similarity between the evaluation tag and the result of the responses of the user.

In addition, in a case in which an action history or the like of a user can be used, the question-answering system 112 may estimate evaluations with respect to each evaluation expression from the action history, generate a vector of the action history in the same manner as the vector of the result of the responses of the user, and determine information being presented in consideration of a degree of similarity between both of the vectors.

When the taste of the user is obtained by outputting the questions as described above and acquiring answers with respect to the questions, even in a case in which little or no action history is presented, information relating to the taste of the user can be presented. In addition, based on the evaluation expression, since the taste of the user is estimated, information suitable for the user can be appropriately presented to not only the taste of which the attributes for example, presence or absence of equipments of Wifi, an outdoor spa, and the like are clearly determined, but also a subject which is difficult to be searched due to ambiguous requests and keywords. Further, in this example, since evaluation expressions in each subject type are analyzed, the information can be appropriately presented based on the evaluation expressions different from each subject type. In addition, since the analyzed result of evaluation expressions between the similar subject types is shared, a relationship between the evaluation expressions with respect to the subject types in which data thereof are little can also be understood.

In the example described above, as an example of the subject to be searched, facilities such as hotels and restaurants being used for a trip are described, but the invention can also be applied for searching other subjects, for example, books, movies, retail articles of any types, facilities of any types, and real estates.

Also, the invention is not limited to the example described above, but various modification examples are included therein. For example, the example described above is described in detail in order to easily understand the invention, and it is not necessarily limited to an example provided with all configurations described above.

Each configuration, function, a processing unit, processing means, and the like described above may be realized by hardware when a part or the entire thereof are installed, for example, by an integrated circuit. In addition, each configuration, function, and the like described above may be realized by software when the processor analyzes and executes programs for realizing each function. Information such as programs, tables, and files for realizing each function can be stored in a storage device such as memories, hard disk drives, and solid state drives (SSD), or non-transitory data storage mediums which is capable of reading a calculator such as IC cards, SD cards, and DVD.

In addition, in drawings, control lines and information lines required for describing the examples are described, but all the control lines and the information lines included in actual products to which the invention is applied are not necessarily limited to being illustrated. In actual, almost all configurations may be considered to be connected to each other.

The invention claimed is:

1. An information processing system that improves search efficiency, the system comprising a memory that stores:
evaluation data in which a plurality of subjects are associated with a plurality of evaluation expressions respectively, and
evaluation expression relationship data indicating relationships between the plurality of evaluation expressions, wherein the evaluation expression relationship data includes information indicating trade-off relationships between the plurality of evaluation expressions; and a processor that is communicatively coupled to the memory, wherein the processor is configured to:
estimate, for each of the plurality of subjects, a number of evaluation expressions that have high accuracy from among the plurality of evaluation expressions based on an appearance frequency of each evaluation expression and a co-occurring frequency of the plurality of evaluation expressions in respective trade-off relationships with each evaluation expression,
generate a plurality of questions based on the evaluation data, the number of evaluations that have high accuracy, and the evaluation expression relationship data,
estimate a number of subjects which do not correspond to responses of the plurality of questions based on the evaluation data;
determine an order of the plurality of questions by sorting the plurality of questions based on the number subjects estimated and the trade-off relationships;
receive responses to the plurality of questions, wherein the responses to the plurality of questions are received according to the order determined, and
output information relating to each of the plurality of subjects based on the responses received.

2. The information processing system according to claim 1, wherein the memory further stores information specifying types of document data from which each evaluation expression is extracted, and
wherein the number of evaluation expressions that have high accuracy is further estimated based on an accuracy of each evaluation expression suitable for each subject on respective specified types of the document data.

3. The information processing system according to claim 1, wherein the evaluation expression relationship data includes information indicating inclusion relationships between the plurality of evaluation expressions, and
wherein, in a case in which, among the plurality of evaluation expressions, a first evaluation expression includes a second evaluation expression, the order is based on the first evaluation expression are output earlier than questions based on the second evaluation expression.

4. The information processing system according to claim 1, wherein the processor is further configured to:
calculate a degree of similarity between one or more responses with respect to one or more output questions and evaluation expressions corresponding to each subject,
wherein the information relating to each of the plurality of subjects further includes the degree of similarity.

5. The information processing system according to claim 4, wherein the evaluation data includes information indicating attributes of an evaluator that used each evaluation expression, and wherein the processor is further configured to:
calculate a weighted appearance frequency of each evaluation expression corresponding to each subject by attributes of the evaluator who used each evaluation expression, and
calculate a degree of similarity between one or more responses with respect to one or more output questions and respective evaluation expressions corresponding to each subject based on the weighted appearance frequency.

6. The information processing system according to claim 4, wherein the evaluation expression relationship data includes information indicating similarity relationships between the plurality of evaluation expressions, and
wherein, in a case in which a number of subjects in which the degree of similarity satisfies a predetermined condition, the order is based on evaluation expressions similar to evaluation expressions which served as bases of the plurality of questions output in advance are output earlier.

7. The information processing system according to claim 1, wherein the processor is further configured to:
extract the plurality of evaluation expressions respectively corresponding to the plurality of subjects from a plurality of document data and generates the evaluation data; and
estimate relationships between respective evaluation expressions from the plurality of document data and generates the evaluation expression relationship data.

8. The information processing system according to claim 7, wherein the processor is further configured to:
specify a part where the plurality of subjects are described and a part where the plurality of evaluation expressions are described by analyzing a layout of each document data,
extract one or more evaluation expressions based on parts of speech or preset regulations from the part where the plurality of evaluation expressions are described,
extract subjects corresponding to a respective evaluation expression extracted from the part where the plurality of subjects are described,
estimate attributes of an evaluator who uses each evaluation expression based on words included in each document data, and
store the evaluation data including the one or more evaluation expressions extracted, the subjects extracted, and the attributes estimated in the memory.

9. The information processing system according to claim 7, wherein the processor is further configured to:
estimate relationships between the plurality of evaluation expressions, and
generate the evaluation expression relationship data from the plurality of document data for each type of subject.

10. The information processing system according to claim 7,
wherein knowledge data including information indicating features of the plurality of document data to be collected and regulations for determining types of document data are further stored in the memory, and
wherein the processor is further configured to:
collect the plurality of document data through a network, associates each of the plurality of collected document data with information indicating respective types of document data, and
store the plurality of document data in the memory.

11. An information processing system comprising:
a memory that stores:
evaluation data in which a plurality of subjects are associated with a plurality of evaluation expressions respectively, and
evaluation expression relationship data indicating relationships between the plurality of evaluation expressions;
and a processor that is communicatively coupled to the memory, wherein the processor is configured to:
estimate relationships between the plurality of evaluation expressions,
generate the evaluation expression relationship data from a plurality of document data for each type of respective subject,
estimate a similarity relationship between two evaluation expressions based a co-occurring frequency of the two evaluation expressions, wherein in a case in which the co-occurring frequency of the two evaluation expressions satisfies a predetermined condition, an inclusion relationship between the two evaluation expressions is estimated based on a bias of an appearance frequency of each evaluation expression when the two evaluation expressions do not co-occur,
generate a plurality of questions based on the evaluation data and the evaluation expression relationship data,
determine an order of the plurality of questions by sorting the plurality of questions based on the similarity relationship and the inclusion relationship estimated,
receive responses to the plurality of questions, wherein the responses to the plurality of questions are received according to the order determined, and
output information relating to each of the plurality of subjects based on the responses received.

12. The information processing system according to claim 11, wherein the processor us further configured to:
estimate similarity relationships between types of subjects, and generates the evaluation expression relationship data based on evaluation expressions corresponding to the types of subjects which are estimated to be similar to each other.

13. An information processing method that improves searching efficiency, the method comprising:
storing, in a memory, evaluation data in which a plurality of subjects are associated with a plurality of evaluation expressions respectively;
storing, in the memory, evaluation expression relationship data indicating relationships between the plurality of evaluation expressions, wherein the evaluation expression relationship data includes information indicating trade-off relationships between the plurality of evaluation expressions;
estimating, for each of the plurality of subjects, a number of evaluation expressions that have high accuracy based on an appearance frequency of each evaluation expression and a co-occurring frequency of the plurality of evaluation expressions in respective trade-off relationships with each evaluation expression;
generating a plurality of questions based on the plurality of evaluation data, the number of evaluations that have high accuracy, and the evaluation expression relationship data;
estimate a number of subjects which do not correspond to responses of the plurality of questions based on the evaluation data;
determine an order of the plurality of questions by sorting the plurality of questions based on the number subjects estimated and the trade-off relationships;

receiving responses to the plurality of questions, wherein the responses to the plurality of questions are received according to the order determined; and outputting information relating to each of the plurality of subjects based on the responses received.

* * * * *